United States Patent [19]
Lee

[11] 4,105,728
[45] Aug. 8, 1978

[54] SPINNING METHOD AND APPARATUS

[75] Inventor: Wei-Kuo Lee, Millburn, N.J.

[73] Assignee: Celanese Corporation, New York, N.Y.

[21] Appl. No.: 725,212

[22] Filed: Sep. 22, 1976

[51] Int. Cl.² ............................................. B28B 21/54
[52] U.S. Cl. ................................ 264/40.7; 264/177 R; 264/178 R; 425/71; 425/376 R; 425/461
[58] Field of Search .............. 264/177 R, 40.7, 178 R; 425/382 R, 71.72, 461

[56] References Cited

U.S. PATENT DOCUMENTS

| 2,168,288 | 8/1939 | Fischer | 264/177 R |
| 4,015,926 | 4/1977 | Nehres | 425/382 R |

*Primary Examiner*—Jay H. Woo

[57] ABSTRACT

Films are formed from liquid polymeric material passed through an elongate exit slit of a die and drawn to a solidification region. A condition of flow of liquid through the slit is established to enforce a controlled ratio of extensional strain rate to shear strain rate on the material leaving the slit by providing a predetermined slit profile to maintain that ratio above a minimum throughout the width of the film.

42 Claims, 11 Drawing Figures

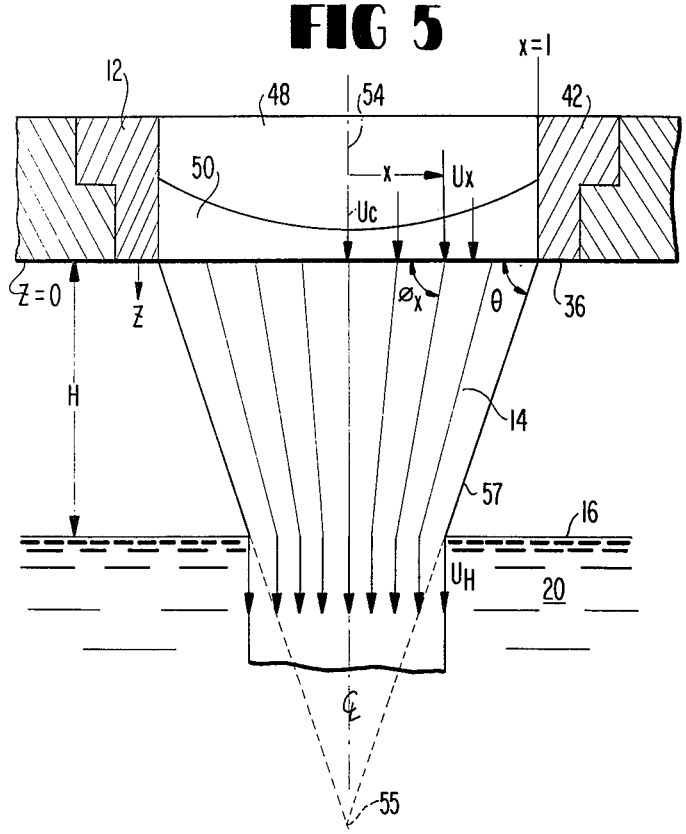
FIG 5
FIG 6
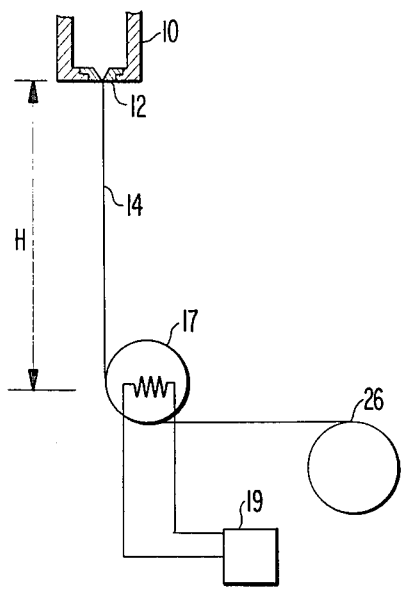
FIG 7
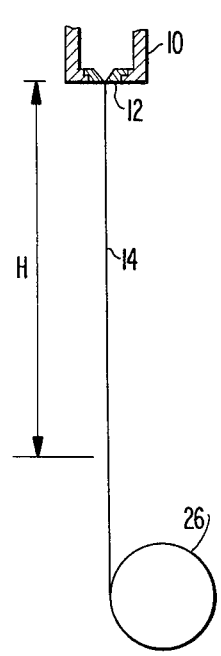
FIG 8
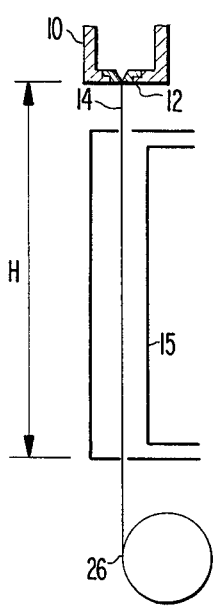
FIG 9

SPINNING METHOD AND APPARATUS

BACKGROUND AND OBJECTS OF THE INVENTION

This invention relates to the formation of synthetic tapes or films from liquid polymeric materials. More particularly, this invention relates to a novel method and apparatus for forming such tapes or films utilizing a die slit configured to enhance productivity and/or film properties.

In the art of melt extrusion of synthetic tapes or films it has been found that productivity is limited by reason of phenomenon termed melt resonance or draw resonance. Draw resonance in connection with such extrusion operations is a type of instability condition which manifests itself as a cyclic variation in the width and the thickness of an extruded tape such that the width and the thickness of the tape vary periodically along the tape length.

When one extrudes and then draws a thermoplastic shape into a quenching medium, the extrudate necks down in the gap between the die and the solidification region. As the windup speed is increased, the cross-sectional area of the extrudate in that gap becomes smaller. With all other extrusion operation parameters fixed, there is usually a windup speed or range of speeds at which the onset of draw resonance instability will occur. At a critical windup speed, a cyclic pulsation appears in the extrudate. This pulsation becomes more pronounced at increased speeds until eventually breakage occurs.

The limiting factor or productivity presented by the need to operate below critical windup speed is readily apparent. Moreover, the problem of windup speed limitation is additionally troublesome in connection with the production of products such as low denier fibrillated yarns. It is desirable to establish higher tape draw ratios in the production of a low denier product. This in turn dictates higher windup speeds which may induce draw resonance.

It is therefore an object of the present invention to provide a novel operation for the formation of synthetic tapes where productivity is enhanced by control of draw resonance.

It is a further object of the present invention to provide such a novel tape forming operation that is particularly adaptable to the high throughput production of low denier products.

In this connection, the present invention embodies the discovery that the onset of draw resonance is related to the ratio of the extensional strain rate of the material leaving the die to shear strain rate of the material inside the die. It has been found that for a given draw down ratio and with other operating parameters constant, the onset of draw resonance instability correlates within a narrow band of values of this ratio of extension rate to shear rate. Above this band stability is present, and below the band deleterious draw resonance occurs.

As draw ratio is increased, the same relationship holds, the only difference being the increased magnitude of the instability band of values of the ratio of extension rate to shear rate.

The present invention further embodies a recognition that the ratio of extension rate to shear rate is a function of quench height, i.e., the gap between the die exit and the region of solidification. Accordingly, the extension rate to shear rate ratio can be controlled by the profile of the exit slit.

Concurrently with the development of the present invention it was determined by the applicant that one explanation for the surprising performance, from the standpoint of draw resonance, of an extrusion die having a slit with radiused ends as disclosed in commonly assigned copending application Ser. No. 633,758 [filed Nov. 20, 1975 for "High Tenacity, Low Denier Poly (ethylene terephthalate) Fibrillated Tape Yarn" by John D. Gibbon] is that the radius at each end of the die slit alters the ratio of extensional strain rate to shear strain rate. While the existence of the particular configuration of die slit set forth in that application preceded the present invention, the present invention proceeded independently, and it was not until the present invention that the foregoing explanation for improved performance of the earlier die was advanced.

In accordance with the present invention the profile of a die exit slit through which liquid polymeric material is passed is configured to establish a controlled ratio of extensional strain rate to shear strain rate entirely across the slit. Through a predetermined configuration of the depth profile of the exit slit, the extension rate to shear rate ratio can be maintained at an acceptable level across the entire slit. The present invention contemplates a similar control over the extension rate to shear rate ratio in connection with a predetermined width profile of the slit.

Additional objects of the present invention will become apparent below, such as the provision of a novel film forming operation wherein draw resonance problems are minimized while a high orientation is imposed on the material exiting from the slit. This is accomplished through control of the extensional strain rate of the material through provision of a predetermined depth profile of the slit.

It will be appreciated that the foregoing objects of the present invention dealing with novel control of draw resonance, throughput, and orientation are intended to embrace tape or film forming operations other than where a melt is extruded through a die and passed to a quenching zone. That is, the present invention contemplates other tape forming operations wherein liquid polymeric material is passed through a slit toward a solidification region, for example tape forming operations where a liquid polymeric solution is passed through a slit toward a solidification region established by the evaporation or dissolution of the solvent for the polymer.

Since it is envisioned that the speed of the variety of tape forming operations contemplated according to the present invention could be significantly increased over present commercial tape forming operations, the term "film or tape spinning" is at times used herein to denote the process and the term "spinneret" is at times used herein to denote the member having the slit with the profile established according to the present invention.

SUMMARY OF PREFERRED FORMS OF THE INVENTION

A preferred form of the invention intended to accomplish at least some of the foregoing objects entails the spinning of tape from fiber forming, liquid polymeric material by passing the material through an elongate exit slit of a spinneret and drawing the material to a solidification zone, while establishing a condition of flow of liquid through the slit to enforce a ratio of the extensional strain rate to the shear strain rate on the material leaving the slit of not less at any location along the slit length than it is adjacent the center of the slit. As such, higher windup speeds may be employed while maintaining operations out of the draw resonance instability zone throughout the width of the tape.

The flow condition may be advantageously established by providing the elongate exit slit with a depth profile that is gradually increased from adjacent the center of the ends of the slit in such a manner as to induce an essentially constant ratio of the extensional strain rate to the shear strain rate throughout the slit length, or in such a manner as to induce an essentially constant extensional strain rate throughout the slit length.

In the former instance, the constant ratio of extensional strain rate to shear strain rate of course ensures operations throughout at a ratio outside the instability zone. In the latter instance (of constant extensional strain rate) it can be shown that away from the slit centerline the resulting ratio of extensional strain rate to shear strain rate will be at least as acceptable as in the former instance of a constant ratio with similar centerline dimensions. Moreover, the latter instance provides the additional advantage of uniform orientation being induced between the slit and solidification zone by reason of the uniform extensional flow.

In another case, the flow condition is established by providing the elongate slit with a gradually decreasing thickness profile from adjacent the center to the ends of the slit. Here again, an essentially constant ratio of the extensional strain rate to the shear strain rate may be induced by gradually curving the thickness profile.

Where the depth profile of the slit is gradually curved from the center to provide an essentially constant ratio of extensional strain rate to shear strain rate, the profile may be described essentially by the equation $$(L_x)^{\frac{1}{n}} \left[ 1 + \frac{\ln (L_x)^{\frac{1}{n}}}{\ln D_c} \right] = 1 + x^2 \cot^2 \theta$$

where $x$ is a dimensionless coordinate from the center of the elongate slit along its length, $\theta$ is the angle of convergence of the outside edge of the tape toward the solidification zone, $D_c$ is the drawdown ratio between the slit and the solidification zone along the centerline, $L_x$ is the ratio of die wall depth along the coordinate $x$ to the die wall depth at the center of the elongate passage, and $n$ is the exponent of the power-law viscosity relationship.

Where the depth profile of the slit is gradually curved from the center to provide an essentially constant extensional strain rate, the profile may be described essentially by the equation $$L_x = K \exp [\beta x^2]$$

where $x$ is a dimensionless coordinate from the center of the elongate slit along its length, $L_x$ is the die slit depth at a given location from the center of the slit divided by the die slit depth at the center of the slit, $\beta$ is a constant and $K$ is a constant. Preferably $\beta$ is determined by the equation $$\beta = n \cot^2 \theta \ln D_c$$

where $\theta$ is the angle of convergence of the outside edge of the tape toward the solidification zone, $D_c$ is the drawdown ratio between the slit and the solidification zone along the centerline, and $n$ is the exponent of the power-law viscosity relationship.

Where the thickness profile of the slit is gradually curved from the center to provide an essentially constant extensional strain rate, the profile may be described essentially by the equation $$T_x = C \exp [-\alpha x^2]$$

where $x$ is a dimensionless coordinate from the center of the elongate slit along its length, $T_x$ is the die slit thickness at a given location from the center of the slit divided by the slit thickness at the center of the slit, $\alpha$ is a constant, and $C$ is another constant. Preferably, $\alpha$ is determined by the equation $$\alpha = n/(n + 1) \cot^2 \theta \ln D_c$$

where $\theta$ is the angle of convergence of the outside edge of the tape toward the solidification zone, $D_c$ is the drawdown ratio between the slit and the solidification zone along the centerline, and $n$ is the exponent of the power-law viscosity relationship.

In its apparatus format, a preferred form of the present invention is embodied by a die having elongate exit slits for the liquid polymeric material, means spaced from the exit slit for solidifying the material, and takeup means for drawing the material between the exit slit and the solidification means, the exit slit being contoured to enforce a ratio of extensional strain rate to shear strain rate on the material leaving the slit not less at any location along the slit length than adjacent the slit center. Particular slit profiles as set forth above are preferred.

Spinning speeds in the range of about 10 to 2000 meters per minute in the case of solution spinning and 100 to 6000 meters per minute in the case of melt spinning are envisioned with about 100 to 1100 meters per minute being preferred for dry and wet spinning and about 500 to 4000 meters per minute being preferred for melt spinning. In solution spinning it is preferred that the temperatures do not exceed more than 50° C. above the boiling point of the solvent at atmospheric pressure. For example, in spinning with a cellulose acetate-acetone solution, spinning temperatures of less than about 105° C. are desired since acetone boils at about 55° C. For melt spinning, appropriate temperatures are those above the melting point and below the decomposition temperatures of the polymer. For example, polyethylene teraphthalate (PET) melts at about 255° C. and spinning temperatures in the range of 285° C. to 305° C. are usual. Polypropylene melts at about 165° C. and spinning temperatures in the range of 200° C. - 290° C. are usual.

The maximum depth of the spinneret exit slit in the case of a slit having a varying depth profile may vary from 0.1 inch to 40 inch, while the minimum depth in such instances may vary from 0.005 inch to 2 inch. Slit widths depend only on the desired width of the product from, for example, 1 to 10 inch. The widths may have a serrated profile as set forth in the aforementioned application Ser. No. 633,758. While such spinnerets may have generally cylindrical internal configurations leading to the slit, it is preferred that they have converging internal walls converging at a selected angle in the range of 20° to 90°, preferably 45° to 75°.

Where the slit width profile is varied, gaps in the range of 2 mils to 1 inch are envisioned, as is a constant slit depth in the range of 5 mils to 250 mils.

In accordance with the present invention, it will be appreciated that spinning of fiber-forming materials by solution spinning (wet or dry) or melt spinning (without significant melt fracture in the range of operating conditions selected for the materials in contemplation for practice of the present invention) of any suitable polymeric materials, such as polyamides, polyesters, polyolefins, acrylics, polyimides, cellulosics, vinyl chloride and vinylidene cyanide polymerics and the like, may be practiced. Particular applicability of the present invention may be found in high speed spinning of polyesters and polyolefins.

BRIEF DESCRIPTION OF THE DRAWINGS

The above-described and many other objects of the invention will be apparent to those skilled in the art when this specification is read in conjunction with the drawings wherein like reference numerals have been applied to like objects and wherein:

FIG. 5 is a view in cross section taken along the line 5—5 of FIG. 3 and includes a schematic representation of the mathematical model of a flow field;

FIG. 6 is a view similar to FIG. 3 illustrating another embodiment of the present invention;

FIG. 7 is a schematic view similar to FIG. 1 using a cooled roller;

FIG. 8 is a schematic view similar to FIG. 1 using an air quench;

FIG. 9 is a schematic view similar to FIG. 1 using a gaseous quench;

DETAILED DESCRIPTION OF THE PREFERRED EMBODIMENTS

Figure 1:
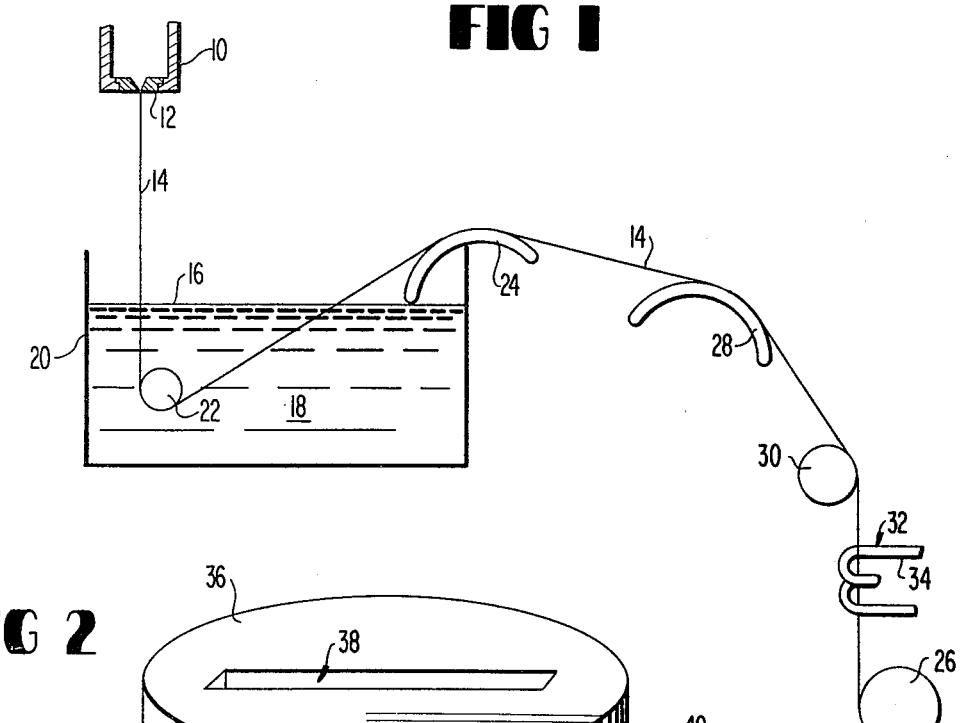
FIG. 1 is a schematic drawing of a film spinning apparatus of the type used in accordance with the present invention.

Depicted in FIG. 1 is a spinneret 12 according to the present invention suitably positioned at the outlet of a supply 10 of liquid polymeric material, such as an extruder assembly. The spinneret 12 may be adapted for use with any conventional supply 10 and cooperates with the supply so that an elongate film or tape 14 is passed through the exit opening of the spinneret.

The film 14 of material remains in a fluid state until it reaches the surface 16 of a water bath 18 contained by a quench tank 20. Upon reaching the surface 16, the film of material 14 is quenched and solidifies. The solidified film 14 is relatively thin and therefore is easily turned around a submerged bobbin 22 in the tank 20. The film 14 emerges from the quench tank 20, then passes over a shoe 24, and may be eventually accumulated on a take-up roll 26. Between the shoe 24 and the take-up roll 26, the film 14 of material may be fibrillated into a multiplicity of generally parallel fibers or strands of yarn.

To effect the fibrillation of the film, the film 14 may first be passed over a hot shoe 28, an idling roller 30, and then through a fibrillation zone 32. The fibrillation zone 32 may comprise, for example, a coiled conduit 34 having a multiplicity of holes directed toward the film 14. Pressurized air is passed through the conduit 34 and exhausts through the holes to generate a region of high turbulence at 32. The turbulence causes the fibrillation of the film 14 into a multiplicity of generally parallel fibers. The fibrillated fibers may then be wound upon the take-up roll 26.

The water quench bath 18 and associated tank 20 are illustrated for purposes of convenience only. It is understood that water is only one of many fluids which might be used for quenching the liquid film of material 14 extruded from the spinneret 12. For example, the quench tank 20 and liquid bath 18 might be removed altogether (see FIG. 8) such that solidification of the film 14 is effected simply by contact with air. Naturally, it would also be possible to provide a gaseous jacket 15 (see FIG. 9) enclosing the film 14 and through which a suitable cooling gas may be passed, either in countercurrent or co-current relationship in order to effect the solidification of the film 14. As another embodiment, the bobbin 22 might be replaced by a suitable conventional cooled roller 17 (see FIG. 7) to effect the solidification of the film 14. A suitable coolant source 19 may be provided to maintain the cooler roller 17 at a desired temperature.

Figure 10:
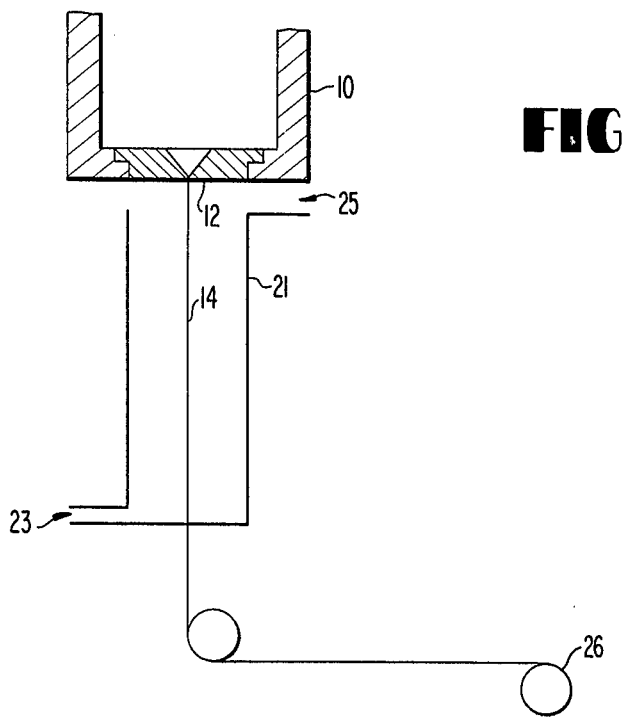
FIG. 10 is a schematic drawing of a dry film spinning apparatus employed in accordance with the present invention.

In the case of dry spinning, as schematically depicted in FIG. 10, a solution of the fiber-forming substance from the supply 10 may be extruded through the spinneret 12 into a heated chamber 21 with hot air entrance 23 and exit 25. The solvent would evaporate in the heated chamber 21 and be taken away by air flux through the exit 25. The film 14 may then be collected by a take-up roll 26. Such a dry-spinning process might be particularly useful in the manufacture of acetate film.

Figure 11:
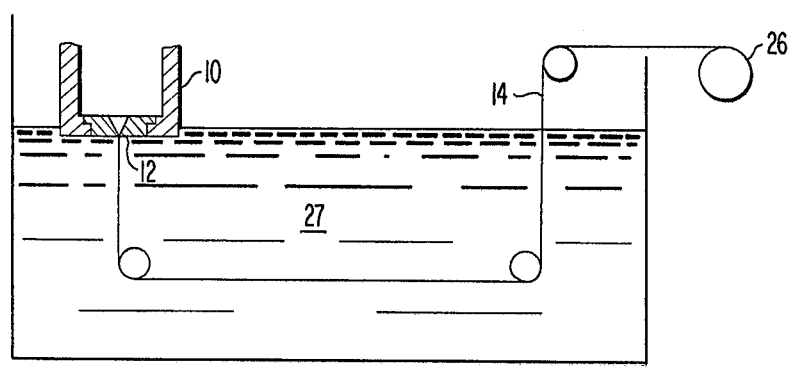
FIG. 11 is a schematic drawing of a wet film spinning apparatus employed in accordance with the present invention.

In wet spinning, as schematically depicted in FIG. 11, a solution of fiber-forming substance from the supply 10 may be extruded through the spinneret 12 into a bath with liquid coagulating medium 27. Film 14 that would be formed after the coagulation may be taken away by a windup device 26. Such a wet spinning process might be particularly useful in the manufacture of nylon or rayon film.

Figure 2:
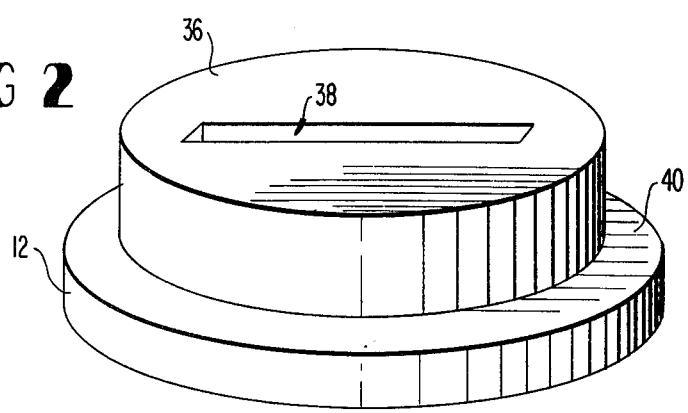
FIG. 2 is a perspective view of a die according to one embodiment of the present invention.

Turning now to FIG. 2, the spinneret 12 is illustrated in an enlarged detail. The spinneret 12 is adapted for connection to an extruder and includes a downstream face 36 which is provided with an elongate exit opening 38 therein. For exit openings with lengths in the range of 0.5 to 1.25 inch, slot gap between 0.004 and 0.010 inches has been used, but, in principle, the length does not have a real limit. Ordinarily, the slot width and the slot length are related: spinning of tape includes an area reduction which may generate an unduly thin film if the slot width and slot length are not properly correlated. The length of the exit opening in the elongate direction is generally related to the size of the extruder apparatus. For conventional extruders in current use, a length in the range of 0.8 to 1.3 inches has been found to be adequate.

As illustrated, the spinneret 12 may comprise a generally circular plate having a radially outwardly extending shoulder 40 toward the upstream end thereof. The shoulder 40 may be used to retain the spinneret 12 in the extruding apparatus 10 (see FIG. 1).

Figure 3:
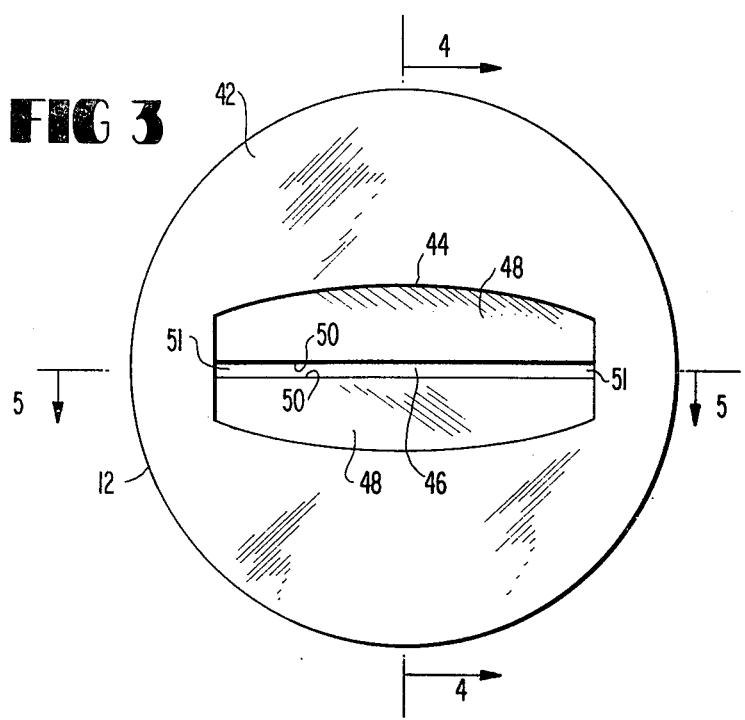
FIG. 3 is a plan view of a die according to a preferred embodiment of the present invention.

Turning now to FIG. 3, the upstream face 42 of the spinneret 12 is more clearly illustrated. The upstream face 42 may have a diameter somewhat greater than the diameter of the downstream face 36 (see FIG. 2) so that the shoulder 40 may be provided. The upstream face 42 is provided with a generally centrally located elongate inlet opening 44.

Figure 4:
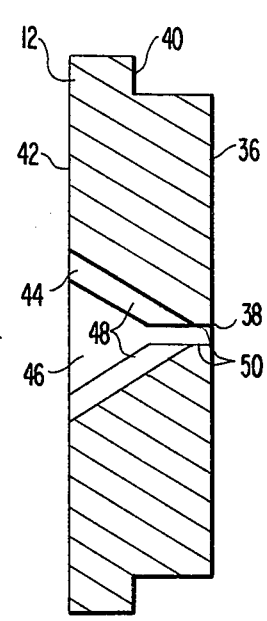
FIG. 4 is a cross-sectional view taken along the line 4—4 of FIG. 3.

With reference to FIG. 4 it will be noted that the inlet opening 44 and the exit opening 38 are interconnected by a passage 46 which includes a pair of mutually inclined walls 48 merging with a pair of generally parallel walls 50. The inclined walls 48 are inclined with respect to one another with an included angle in the range of 10° to 180°. Preferably the included angle is approximately 60° such that the inclined walls 48 define a convergent passage in the flow direction of the liquid synthetic resinous material. The preferred angle has been found to minimize strong eddy currents as well as coinciding with a minimum pressure differential for a given mass flow rate through the passage 46.

The generally parallel walls 50 are located adjacent the exit opening 38 and may be referred to as the die walls. The die walls 50 have a thickness or length, in the direction of the passage 46, which may be variable in accordance with various embodiments of the present invention. The die walls 50 may vary in a symmetric manner with the length increasing from the center of the passage 46 to the ends 51 thereof (see FIG. 3).

Turning now to FIG. 5, the preferred profiles for the die exit opening 38 may be more fully understood. A cursory examination of FIG. 5 will demonstrate that, for a uniform velocity of exit material at the die face 36 and a uniform velocity at $z=H$ ($H$ representing the quench height, i.e. the distance from the die face 36 to the zone where the film can be considered solidified), stream tubes at the centerline 54 and at the edge 57 of the film must experience different rates of elongation or extension. With that in mind, the following derivation of preferred exit slit profiles will be appreciated.

The continuity equation for steady one-dimensional flow of a fluid is given by $$Q = \rho U A \qquad [1]$$

where $Q$ is defined as the mass flow rate [M/T], $\rho$ is the material density [M/L$^3$], $U$ is the average velocity [L/T] and $A$ is the flow area [L$^2$] normal to the direction of the velocity $U$. For convenience, the units of the various parameters in the above and subsequent equations will be expressed in terms of fundamental units, M standing for mass, L standing for distance or length, T standing for time, and F standing for force. Either the British engineering system of units consisting of pounds mass, pounds force, feet and seconds, or the metric system, comprising newtons, kilograms, meters, and seconds, may be employed to maintain a consistent set of units for the equations.

The extensional stress $\tau$ [F/L$^2$] in a particular fluid is often expressed as the relationship $$\tau = \bar{\eta}\Gamma \qquad [2]$$

where $\eta$ is the extensional viscosity [FT/L$^2$] of the given fluid and $\theta$ is the rate of extensional deformation [1/T] of the fluid. The rate of extensional deformation is defined as the partial derivative of the velocity $U$ with respect to a coordinate taken in the direction of the velocity $U$. For the mathematical model of FIG. 5, the rate of extensional deformation may thus be described as follows $$\Gamma \equiv \delta U/\delta z \qquad [3]$$

where $z$ [L] is the direction taken downstream from the spinneret 12.

For a fluid with constant density $\rho$, equation [2] may be rewritten as follows by substituting the right side of equation [3] for $\Gamma$ and by solving equation [1] for $U$ and substituting that expression into the expression of equation [3] for the rate of extensional deformation $\Gamma$ $$\tau = \bar{\eta}\frac{Q}{\rho}\left(-\frac{1}{A^2}\right)\frac{\delta A}{\delta z} \qquad [4]$$

In a one dimensional system, the area, $A$, is a function of the coordinate $z$ only, and the partial derivative with respect to the coordinate $z$ may be expressed as the total derivative with respect to the coordinate $z$. Accordingly equation [4] may be rearranged to give $$\tau A dz = -\bar{\eta}\frac{Q}{\rho}\frac{dA}{A} \qquad [5]$$

Noting that the extensional stress $\tau$ times the area A [L$^2$] is actually equal to $F_e$, the force causing the extensional stress, the left hand side of equation [5] may be integrated from $z=0$ to $z=z$ and the right hand side integrated between corresponding limits from $A=0$ to $A=A$. The resulting expression is slightly rearranged and divided by the product $Az$ to give the following equation $$\tau_z = \frac{\bar{\eta}Q}{A\rho z}\ln\left(\frac{A_o}{A}\right) \qquad [6]$$

where $\tau_z$ is the extensional stress at a given value of the coordinate $z$, and $\rho$, and $\bar{\eta}$ are taken as constant values.

Substituting for the mass flow rate $Q$ from equation [1] and noting from equation [2] that the extensional stress is equal to the extensional viscosity times the rate of extensional deformation $\Gamma$, the rate of extensional deformation $\Gamma$ at a given value of the coordinate $z$ is given by the following expression $$\Gamma_z = \frac{U_z}{z}\ln\left(\frac{A_o}{A}\right) \qquad [7]$$

the value of the rate of extensional deformation when the coordinate $z$ assumes the value $z=H$, corresponding to the quench height of the fluid material expressed through the spinneret 12, may thus be given as follows $$\Gamma_H = \frac{U_H}{H}\ln\left(\frac{A_o}{A_H}\right) \qquad [8]$$

For the liquid quench illustrated in FIG. 1, the quench height $H$ may lie between 0.5 and 1.5 inches. With other quenching systems (FIGS. 7 to 9), the quench height $H$ may be as long as 6 feet.

Now, by writing the continuity equation [1] at the downstream face of the die 36 and at the quench height $H$ [L], a relationship between the corresponding areas and velocities may be obtained which, when substituted into equation [8], gives the following expression for the rate of extensional deformation $$\Gamma_H = (U_H/H) \ln (U_H/U_C) \qquad [9]$$

It should be noted here that equation [9] relates the rate of extensional deformation $\Gamma_H$ throughout the fluid portion of the film 14 to the quench height $H$, the velocity $U_H$ (corresponding to the take-up speed of the take-up roll 26 in FIG. 1) and the velocity $U_c$ (corresponding to the velocity of fluid material entering a streamtube along the center line 54 of the film 14 at the downstream face 36).

By assuming that the fluid flow between the downstream face 36 of the spinneret 12 and the quench height $H$ comprises a plurality of generally convergent streamtubes which are essentially radial with respect to a point 55, the inlet velocity for each streamtube and the length coordinate $z$ along each streamtube may be replaced by the following expressions $$U_{x_1} = U_x \sin \theta_x \qquad [10]$$

$$H_x = H/\sin \theta_x \qquad [11]$$

where $\theta_x$ is the angle between the streamtube axis at a position $x$ from the centerline and the downstream coordinate $z$, $U_x$ is the $z$ component of the velocity of material at the exit opening for a given value of $x$, $U_{x_1}$ is its component velocity along the streamline and $H_x$ is the effective quench height for a streamtube with an inlet at $x$.

When the expressions [10], [11] are used in equation [9] for the corresponding deformation rate along a streamline, the rate of extensional deformation is given by the following expression $$\Gamma_{Hx} = \frac{U_H}{H} \sin^2\phi_x \ln\left(\frac{U_H}{U_x}\right) \qquad [12]$$

The dimensionless coordinate $x$ is taken in the elongate direction of the exit opening with the center line of the exit opening being the value $x=0$ and the edge 51 of the die or spinneret 12 being the value $x=1$.

The ratio of the rate of extensional deformation for a given value of the dimensionless coordinate $x$ ($\Gamma_{Hx}$) to the rate of extensional deformation at the center line ($\Gamma_{Hc}$) is determined by dividing equation [12] by equation [7] and rearranging to obtain $$\frac{\Gamma_{Hx}}{\Gamma_{Hc}} = \sin^2\phi_x \left[ 1 + \frac{\ln\left(\frac{U_c}{U_x}\right)}{\ln D_c} \right] \qquad [13]$$

where $D_c$ is the draw-down ratio which is given by the ratio of the wind-up speed $U_H$ to the center line velocity of $U_c$ at the downstream face 36 of the spinneret 12. Alternatively, the draw-down ratio may be defined as the ratio of the cross-sectional area of the exit opening 38 to the cross-sectional area of the film at the quench height $z=H$. For most useful spinning apparatus, the draw-down ratio lies between 1.05 and 10,000 and preferably between 10 and 150.

For the condition where a rate of extensional deformation $\Gamma_H$ is uniform across the film 14 extruded through the spinneret 12, the left hand side of equation [13] becomes unity and equation [13] may be solved for the ratio of the center line velocity to the velocity at a particular value of the dimensionless coordinate $x$ to obtain the following expression $$\frac{U_c}{U_x} = D_c^{cot^2\phi_x} \qquad [14]$$

From simple geometrical considerations, the $\cot\theta_x$ may be replaced by $x \cot\theta$, where the angle $\theta$ is the angle of the edge filament or stream tube 57 of the film 14 with respect to the direction of the dimensionless coordinate $x$. In most spinning systems $\theta$ lies between 30° and 85° with a preferred range being from 45° to 60°. Equation [14] may then be rewritten as follows $$\frac{U_c}{U_x} = D_c^{x^2 cot^2\theta} \qquad [15]$$

The velocity distribution given by equation [15] may be obtained in one of two methods: by varying the die wall thickness 50 normal to the downstream face 36 while the distance between the parallel die walls 50 (i.e., the thickness of the slit, see FIGS. 4 and 5) remains constant; or by maintaining the thickness of the die wall 50 constant across the slit while varying the transverse width (see FIG. 6). We shall treat each of these relationships in turn.

The shear stress acting on the wall of a round stream tube is sometimes written in the following form $$\tau_w = \frac{D \Delta p}{4L} \qquad [16]$$

where $\tau_w$ is the shear stress at the wall, $D$ is the diameter [L] of the stream tube, $\Delta p$ is the pressure differential [F/L$^2$] between the ends of the stream tube, and L is the length [L] of the stream tube. Another well known relationship for the shear stress at the wall is given as follows $$\tau_w = \mu \dot\gamma \qquad [17]$$

where $\mu$ is the viscosity [FT/L$^2$] of the fluid and $\dot\gamma$ is the rate of shear deformation [1/T] of the fluid in the direction of the dimensionless coordinate $x$. For non-Newtonian fluids, the shear viscosity $\mu$ is frequently written in a power-law relationship as follows $$\mu = m(\dot\gamma)^{n-1} \qquad [18]$$

where $n$ is a material parameter, $m$ is another material parameter and the Metzner correction is ignored.

The material parameter $n$ is between 0 and 1 for most useful synthetic resinous materials and lies between 0.85 and 0.90 for PET and between 0.25 and 0.4 for polypropylene. The parameter $m$, for PET, is about 2000 dyne sec $n$/cm$^2$ [FT$^n$/L$^2$] for temperatures in the range of 280° C. to 300° C., and for polypropylene is about $10^4$ dyne sec $n$/cm$^2$ [FT$^n$/L$^2$] for temperatures in the range of 230° C. to 280° C.

It can be shown that for a round tube, such as a stream tube having a power-law fluid passing there-through, the rate of shear deformation $\dot{\gamma}$ is approximated by the following relationship $$\dot{\gamma} = 8U/D \qquad [19]$$

Substituting equations [18] and [19] into equation [17], equating the result to equation [16], and then solving for the velocity $U$, gives the following relationship $$U = \left[\frac{\Delta p}{4Lm}\right]^{\frac{1}{n}} \frac{D^{\frac{n+1}{n}}}{8} \qquad [20]$$

From equation [20] it will be apparent that the velocity $U$ varies as $(1/L)^{1/n}$. Similarly, the velocity varies directly as the diameter of the stream tube, $D$, raised to the $(n+1)/n$ power.

By assuming that the pressure upstream of the die opening is constant and that the pressure downstream of the die exit opening is also constant, the pressure differential $\Delta p$ across the slit is a constant. Therefore, equation [15] may be recast in terms of the ratio of the lengths of the die wall 50 to give the following relationship $$L_x/L_c = e^{nx^2\cot^2\theta \ln D_c} \qquad [21]$$

In a simpler form, the expression of equation [21] becomes $$L_x/L_c = e^{\Sigma x^2} \qquad [22]$$

where the dimensionless parameter $\Sigma$ is given by $$\Sigma = n\cot^2\theta \ln D_c \qquad [23]$$

and is independent of the dimensionless parameter $x$. Values of $\Sigma$, as defined in equation [23], between 1 and 3 have been successfully tested. Equation [21] thus defines the relationship between the die wall thickness profile, the draw-down ratio, $D_c$, and the angle, $\theta$, a normalized slit half-width, $x$, and the power-law viscosity exponent, $n$.

The wall 50 illustrated in FIG. 5 has been machined in accordance with the exponential contours disclosed by equations [21] and [22]. The die wall thickness at the centerline 54 may lie between 0.009 inches and 0.095 inches with the die wall thickness at 51 being from 2.7 to 20 times the centerline die wall thickness depending on the value of $\Sigma$ and the slit length. The wall profile between the centerline 54 and the ends 51 is defined by equation [22].

For another useful relationship, it will be seen from equation [20] that the velocity $U$ varies directly as $D^{(n+1)/n}$. Accordingly, equation [15] may be rearranged and rewritten in terms of the ratio of the thickness at a given point $t_x$ to the thickness at the center line $t_c$ as follows $$\frac{t_x}{t_c} = e^{-\frac{n}{n+1} x^2\cot^2\theta \ln D_c} \qquad [24]$$

Equation [24] may also be rewritten in a more convenient form as follows $$\frac{t_x}{t_c} = e^{\sigma_t x^2} \qquad [25]$$

where the parameter $\Sigma$ is independent of the dimensionless parameter $x$ and is given by equation [26]

$$\sigma_t = -\frac{n}{n+1}\cot^2\theta \ln D_c \qquad [26]$$

A spinneret machined in accordance with equation [24] and [25] is illustrated in FIG. 6. The walls 56 are parallel in the direction of flow and define an elongate opening which is thicker at the middle than at the ends. For similar values of $\theta$ and $D_c$, the value of $\Sigma_t$ as defined by equation [26] may lie between $-0.04$ and $-2.4$. That is, the distance between walls 56 at the centerline may be from 1.04 to 11.02 times the distance between the walls at the ends of the slot.

From the relationships already presented, it can be easily shown that the ratio of the rate of extensional deformation to the rate of shear deformation at a given value of the dimensional coordinate $x$ can be expressed as follows $$\frac{\Gamma_{Hx}}{\dot{\gamma}_x} = \frac{\Gamma_{Hc}}{\dot{\gamma}_c}\left(\frac{\dot{\gamma}_c}{\dot{\gamma}_x}\right)\sin^2\phi_x\left[1 + \frac{\ln\left(\frac{U_c}{U_x}\right)}{\ln D_c}\right] \qquad [27]$$

Now, when the ratio of the rate of extensional deformation to the rate of shear deformation is constant across the width of a slit, the left-hand side of equation [27] may be divided by the first expression on the right-hand side of equation [27] to obtain a value of unity.

From equations [16], [18] and [19] it can be readily shown that both $\dot{\gamma}$ and $U$ vary directly as $L^{-1/n}$. Using these expressions in equation [27], equation [27] may be rewritten as follows $$\left(\frac{L_x}{L_c}\right)^{\frac{1}{n}}\left[1 + \frac{\ln\left(\frac{L_x}{L_c}\right)^{\frac{1}{n}}}{\ln D_c}\right] = 1 + x^2\cot^2\theta \qquad [28]$$

Equation [28], then, gives the relationship for the length of the die wall 50 at a given value of the dimensionless parameter $x$ to the length of the die wall 50 at the center line which will effect a constant ratio of the rate of extensional deformation to the rate of shear deformation. This ratio has been found to be an effective criterion for maintaining the film 14 in a region free from draw resonance. Parenthetically it may be noted that draw resonance is sometimes referred to as melt resonance or flow resonance.

Using equations [21] and [28], it can be mathematically proven that the contour described by equation [21] provides a thicker die wall thickness 50 than does the contour defined by equation [28], assuming that the centerline die wall thickness 50 is the same for both profiles. With $\Gamma/\dot{\gamma}$ being a stability parameter, it will be apparent that, by selecting the wall profile according to equation [21], the stability characteristics of equation [28] are inherently assured.

As discussed above, the wind-up speed has in the past provided a limitation on the production of fibers. In the nomenclature used above, the wind-up speed is $U_H$ and corresponds to the tangential speed of the take-up roll 26 (see FIG. 1). Formerly, wind-up speeds for PET spinning between 90 and 100 meters/minute were attainable with the die design of the aforesaid application Ser. No. 633,758, and speeds of only 10 to 20 meters/minute were attainable with conventional flat profiles. Following discovery of the present invention, and the spinneret embodying a profile giving constant extensional stress, wind-up speeds of 1100 meters/minute have been obtained without instability problems. In tests conducted, the maximum speed available from the drive motor was attained and no indicia of draw-resonance were observed. For polypropylene, spinning speeds up to 600 meters/minute have been obtained with the present invention versus the conventional spinneret speeds of 15 meters/minute. Accordingly, with the present invention the production rate of conventional spinning apparatus may be improved by an order of magnitude.

It will now be apparent to those skilled in the art that there has been provided in accordance with the present invention a spinneret having a slit profile which may be used to define a constant rate of extensional stress across the width of the film and thereby substantially eliminate the draw-resonance phenomenon. It will, moreover, be apparent to those skilled in the art, that many substitutions, variations, equivalents and modifications for the specific configurations illustrated may be made. Accordingly, it is expressly intended that all such variations, modifications, equivalents and substitutions which fall within the spirit of the invention as defined in the appended claims be embraced thereby.

What is claimed is:

1. In a method of forming tape from fiber-forming liquid polymeric material wherein the material is passed through an elongate exit slit of a die and drawn to a solidification zone, the improvement comprising establishing a condition of flow of liquid material through the slit to enforce a ratio of the extensional strain rate to the shear strain of the liquid material leaving the slit of not less, at any location along the slit length, than that ratio adjacent the center of the slit.

2. The method according to claim 1 wherein the flow condition is established by providing said elongate exit slit with a gradually increasing depth profile from adjacent the center to the ends of the slit such that an essentially constant ratio of the extensional strain rate to the shear strain rate is reduced throughout the slit length.

3. The method according to claim 1 wherein the flow condition is established by providing said elongate exit slit with a gradually increasing depth profile from adjacent the center to the ends of the slit such that an essentially constant extensional strain rate is induced throughout the slit length.

4. The method according to claim 1 wherein the flow condition is established by providing said elongate slit with a gradually decreasing thickness profile from adjacent the center to the ends of the slit.

5. The method according to claim 4 wherein the exit slit is provided with said thickness profile curved to induce an essentially constant ratio extensional strain rate throughout the slit length.

6. The method of claim 1 of forming tape from a melt of polymeric material wherein the tape is taken up at speeds in the range of about 100 to 6000 meters per minute.

7. The method of claim 6 wherein the tape is taken up at speeds in the range of about 500 to 4000 meters per minute.

8. The method of claim 6 wherein the polymeric material is polypropylene and the tape is taken up at speeds in the range of about 100 to 600 meters per minute.

9. The method of claim 1 of forming tape from a solution of polymeric material wherein the tape is taken up at speeds in the range of about 10 to 2000 meters per minute.

10. The method of claim 9 wherein the tape is taken up at speeds in the range of about 100 to 1100 meters per minute.

11. The method of claim 1 of forming tape from a melt of polypropylene wherein the polymeric material is passed through the slit at a temperature in the range of about 200° C. to 290° C.

12. The method of claim 1 of forming tape from a melt of polyethylene teraphthalate wherein the polymeric material is passed through the slit at a temperature in the range of about 285° C. to 325° C.

13. The method of claim 1 wherein the material is passed through an exit slit having a varying depth profile with a minimum depth in the range of about 0.005 inch to 2 inches and a maximum depth of about 0.1 inch to 40 inches.

14. The method of claim 13 wherein the material is passed through a die having converging internal walls converging at an angle in the range of about 20° to 90° toward the exit slit.

15. The method of claim 13 wherein the material is passed through a die having converging internal walls converging at an angle in the range of about 45° to 75°.

16. The method of claim 1 wherein the material is passed through an exit slit having a varying width profile with widths in the range of about 2 mils to 1 inch.

17. The method of claim 29 wherein the exit slit has a constant depth in the range of 5 mils to 250 mils.

18. In a method of forming film from fiber-forming liquid polymeric material wherein the material is extruded through an elongate exit slit of a die and drawn to a solidification zone, the improvement comprising establishing a condition of flow of liquid through the slit to enforce a ratio of the extensional strain rate to the shear strain rate of the material leaving the slit such that said ratio is maintained constant across the slit or increased from the slit center by flowing the liquid through a slit having a gradually increased depth on both sides of the center.

19. The method according to claim 18 wherein the flow condition is established with a constant ratio of extensional strain rate to shear strain rate by providing a slit having a depth profile described essentially by the equation $$(L_x)^{\frac{1}{n}} \left[ 1 + \frac{\ln (L_x)^{\frac{1}{n}}}{\ln D_c} \right] = 1 + x^2 \cot^2 \theta$$

where $x$ is a dimensionless coordinate from the center of the elongate slit along its length, $\theta$ is the angle of convergence of the outside edge of the tape toward the solidification zone, $D_c$ is the drawdown ratio between the slit and the solidification zone along the centerline, and $L_x$ is the ratio of die wall depth along the coordinate $x$ to the die wall depth at the center of the elongate passage.

20. The method according to claim 19 wherein $D_c$ is in the range of 1.05 to 10,000.

21. The method according to claim 19 wherein $D_c$ is in the range of about 10 to 150.

22. The method of claim 19 wherein $\theta$ is in the range of about 30° to 85°.

23. The method of claim 19 wherein $\theta$ is in the range of about 45° to 60°.

24. The method according to claim 18 wherein the flow condition is established with an increasing ratio of extensional strain rate to shear strain rate and an essentially constant extensional strain rate by providing a slit having a depth profile described essentially by the equation $$L_x = K \exp [\beta x^2]$$

where $x$ is a dimensionless coordinate from the center of the elongate slit along its length, $L_x$ is the die slit depth at a given location from the center of the slit divided by the die slit depth at the center of the slit, $\beta$ is a constant and $K$ is a constant.

25. The method according to claim 23 wherein the constant $\beta$ is determined by the equation $$\beta = n \cot^2 \theta \ln D_c$$

where $\theta$ is the angle of convergence of the outside edge of the tape toward the solidification zone, $D_c$ is the drawdown ratio between the slit and the solidification zone along the centerline, and $n$ is the exponent of the power-law viscosity relationship.

26. The method according to claim 18 wherein the flow condition is established with an increasing ratio of extensional strain rate to shear strain rate and an essentially constant extensional strain rate by providing a slit having a thickness profile described essentially by the equation $$T_x = C \exp [\alpha x^2]$$

where $x$ is a dimensionless coordinate from the center of the elongate slit along its length, $T_x$ is the die slit thickness at a given location from the center of the slit divided by the slit thickness at the center of the slit, $\alpha$ is a constant, and $C$ is another constant.

27. The method according to claim 26 wherein the constant $\alpha$ is determined by the equation $$\alpha = -n (n+1)/\cot^2 \theta \ln D_c$$

where $\theta$ is the angle of convergence of the outside edge of the tape toward the solidification zone, $D_c$ is the drawdown ratio between the slit and the solidification zone along the centerline, and $n$ is the exponent of the power-law viscosity relationship.

28. In an apparatus for forming tape from fiber-forming liquid polymeric material wherein the material is passed through an elongate exit slit of a die and drawn to a solidification zone, the improvement comprising an exit slit configuration for the die which enforces a ratio of extensional strain rate to the shear strain rate of the material leaving the slit of not less, at any location along the slit length, than that ratio adjacent the center of the slit.

29. The apparatus according to claim 28 wherein said elongate exit slit has a gradually increasing depth profile from adjacent the center to the ends of the slit such that an essentially constant ratio of the extensional strain rate to the shear strain rate is induced throughout the slit length.

30. The apparatus according to claim 28 wherein said elongate exit slit has a gradually increasing depth profile from adjacent the center to the ends of the slit such that an essentially constant extensional strain rate is induced throughout the slit length.

31. The apparatus according to claim 28 wherein said elongate slit has a gradually decreasing thickness profile from adjacent the center to the ends of the slit.

32. The apparatus according to claim 31 wherein the exit slit has a thickness profile curved to induce an essentially constant ratio extensional strain rate throughout the slit length.

33. In an apparatus for forming film from fiber-forming liquid polymeric material wherein the material is extruded through an elongate exit slit of a die and drawn to a solidification zone, the improvement comprising an exit slit configuration for the die which enforces a ratio of the extensional strain rate to the shear strain rate of the material leaving the slit such that said ratio is maintained constant across the slit or increased from the slit center, said slit having a gradually increased depth on both sides of the center.

34. The apparatus according to claim 33 wherein said slit has a depth profile described essentially by the equation $$(L_x)^{\frac{1}{n}} \left[ 1 + \frac{\ln (L_x)^{\frac{1}{n}}}{\ln D_c} \right] = 1 + x^2 \cot^2 \theta$$

where $x$ is a dimensionless coordinate from the center of the elongate slit along its length, $\theta$ is the angle of convergence of the outside edge of the tape toward the solidification zone, $D_c$ is the drawdown ratio between the slit and the solidification zone along the centerline, and $L_x$ is the ratio of die wall depth along the coordinate $x$ to the die wall depth at the center of the elongate passage.

35. The apparatus according to claim 34 wherein $D_c$ is in the range of 1.05 to 10,000.

36. The apparatus according to claim 34 wherein $D_c$ is in the range of about 10 to 150.

37. The apparatus according to claim 34 wherein $\theta$ is in the range of about 30° to 85°.

38. The apparatus according to claim 34 wherein $\theta$ is in the range of about 45° to 60°.

39. The apparatus according to claim 33 wherein said slit has a depth profile described essentially by the equation $$L_x = K \exp [\beta x^2]$$

where $x$ is a dimensionless coordinate from the center of the elongate slit along its length, $L_x$ is the die slit depth at a given location from the center of the slit divided by the die slit depth at the center of the slit, $\beta$ is a constant and $K$ is a constant.

40. The apparatus according to claim 38 wherein the constant $\beta$ is determined by the equation $$\beta = n \cot^2 \theta \ln D_c$$

where $\theta$ is the angle of convergence of the outside edge of the tape toward the solidification zone, $D_c$ is the drawdown ratio between the slit and the solidification zone along the centerline, and $n$ is the exponent of the power-law viscosity relationship.

41. The apparatus according to claim 33 wherein said slit has a thickness profile described essentially by the equation $$T_x = C \exp[\alpha x^2]$$

where $x$ is a dimensionless coordinate from the center of the elongate slit along its length, $T_x$ is the die slit thickness at a given location from the center of the slit divided by the slit thickness at the center of the slit, $\alpha$ is a constant, and $C$ is another constant.

42. The apparatus according to claim 33 wherein the constant $\alpha$ is determined by the equation $$\alpha = /-n(n+1)\cot^2\theta \ln D_c$$

where $\theta$ is the angle of convergence of the outside edge of the tape toward the solidification zone, $D_c$ is the drawdown ratio between the slit and the solidification zone along the centerline, and $n$ is the exponent of the power-law viscosity relationship.

* * * * *